(12) United States Patent
Chang

(10) Patent No.: US 7,200,143 B2
(45) Date of Patent: Apr. 3, 2007

(54) INTERGRATED SERVICES DIGITAL NETWORK PRIVATE BRANCH EXCHANGE CAPABLE OF CHOOSING SYNCHRONIZATION CLOCK SOURCE AUTOMATICALLY

(75) Inventor: Tu-Yiin Chang, Hsinchu (TW)

(73) Assignee: Winbond Electronics Corp., Hsinchu (TW)

( * ) Notice: Subject to any disclaimer, the term of this patent is extended or adjusted under 35 U.S.C. 154(b) by 1209 days.

(21) Appl. No.: 10/047,758

(22) Filed: Jan. 15, 2002

(65) Prior Publication Data

US 2003/0133474 A1 Jul. 17, 2003

(51) Int. Cl.
*H04L 12/66* (2006.01)

(52) U.S. Cl. .................. 370/356; 370/354; 370/355; 370/357; 370/371; 370/372; 370/373; 370/374; 370/376; 370/503; 370/507; 370/509; 370/518; 370/520

(58) Field of Classification Search ............... 370/503, 370/507, 509, 518, 520; 375/354, 356, 355, 375/371, 372, 373, 374, 375, 376

See application file for complete search history.

(56) References Cited

U.S. PATENT DOCUMENTS 4,841,551 A * 6/1989 Avaneas .................. 375/371
2002/0038435 A1* 3/2002 Akamatsu et al. .......... 713/600

* cited by examiner

*Primary Examiner*—Chi Pham
*Assistant Examiner*—Raj K. Jain
(74) *Attorney, Agent, or Firm*—J.C. Patents

(57) ABSTRACT

An integrated services digital network private branch exchange, which is capable of automatically choosing a synchronization clock source. The integrated services digital network private branch exchange comprises a plurality of trunk chips, a plurality of subscribe chips, and a plurality of priority selection circuits. Wherein, the trunk chips connect to the network terminal via the trunk interface, and then connect to the central office via the network terminal to receive the frame synchronization clock output signal and the data clock output signal. Whereas, the subscribe chips connect to the terminal equipment via the subscribe interface. The priority selection circuits that are connected to each other in a daisy chain circuit manner are connected to the trunk chips to send out the frame synchronization clock output signal and the data clock output signal.

13 Claims, 4 Drawing Sheets

INTERGRATED SERVICES DIGITAL NETWORK PRIVATE BRANCH EXCHANGE CAPABLE OF CHOOSING SYNCHRONIZATION CLOCK SOURCE AUTOMATICALLY

BACKGROUND OF THE INVENTION

1. Field of Invention

The present invention generally relates to an integrated services digital network private branch exchange capable of choosing a synchronization clock source, a method for choosing the synchronization clock source, and a control method of the digital phase-locked loop. More particularly, an integrated services digital network private branch exchange capable of automatically choosing a synchronization clock source, a method for automatically choosing the synchronization clock source, and a control method of the digital phase locked loop.

2. Description of Related Art

FIG. 1 shows a conventional integrated services digital network private branch exchange (abbreviated to ISDN PBX). The ISDN PBX (12) comprises N (N is a positive integer) trunk (LT-T) chips 16 and M subscribe (LT-S) chips 18. Wherein, the N LT-T chips 16 connect to the network terminal 1 (abbreviated to NT1) via the trunk (abbreviated to T) interface, and then connect to the central office (abbreviated to CO) via the NT1. Whereas, the N LT-S chips 18 connect to the terminal equipment (abbreviated to TE) via the subscribe (abbreviated to S) interface. It is essential in the ISDN PBX (12) to have the clock source synchronous to the central office. Therefore, speedily and automatically choosing the clock source that is synchronous to the central office is an important issue.

A stable free-running clock has to be provided to the ISDN PBX when no external line is called and used. When one of the external lines is called and used, the layer 1 of one of the N LT-T chips 16 is activated to generate a clock source that is synchronous to the central office. This is called the clock pulse (abbreviated to CP) and an active layer 1 (abbreviated to ACTL1) from the clock recovery circuit. The CP is used as the reference clock of the ISDN PBX. In FIG. 1, a generic circuit interface (abbreviated to GCI) bus of the non-terminal mode 8 channel is used as the system bus. The operational frequency of the data clock (abbreviated to DCL) signal is 4.096 MHz and the frame synchronization clock (abbreviated to FSC) signal is 8 KHz. The conventional method for choosing the synchronization clock source locks the CP via the digital phase locked loop (abbreviated to DPLL) to generate the DCL for the ISDN PBX. The portion marked as 10 in FIG. 1 is the digital phase locked loop and the glue logic; both of them need to be added in extra. In the conventional method for choosing the synchronization clock source, if multiple external lines are called and used simultaneously, the ISDN PBX determines CP among the N LT-T chips 16, which LT-T chip's layer 1 is activated, by first using the software and then the microprocessor 14. Then randomly chooses the clock of the LT-T chip that is in the active state as the reference clock of the local ISDN PBX. The software requires choosing the clock source that is synchronous to the central office, so the real-time control cannot be achieved and the system resources are wasted.

Thus, as described above, the conventional technique has following disadvantages:

1. Because the control is achieved by software, the real-time control cannot be achieved and the system performance of the ISDN PBX is hard to be assured.

2. Due to all the external lines can possibly be connected or hung up at the same time and in order to obtain an external line that is being called or connected as the reference clock, the software is busy doing the polling and matching. Therefore, the system performance is degraded.

3. The complexity of the software program is increased.

4. The DPLL and the glue logic circuit have to be added in extra to achieve the function of the synchronization clock source.

5. Not capable of automatically choosing the appropriate clock source that is synchronous to the central office.

6. Due to the ISDN PBX being not capable of automatically choosing the synchronization clock source, the DPLL have to be in the power-on state all the time, thus the consumption of the power is increased.

SUMMARY OF THE INVENTION

To solve this problem, the present invention provides an ISDN PBX capable of automatically choosing a synchronization clock source, a method for automatically choosing the synchronization clock source, and a control method of the DPLL. The ISDN PBX integrates the DPLL circuit into the chip, thus reduces the space that is occupied by the printed circuit board and the number of elements in the printed circuit board. Furthermore, the ISDN PBX is not only capable of automatically choosing the synchronization clock source by using the priority selection circuit thus having the software determine the reference synchronization clock source without repeatedly polling and matching, but also turns off the power of the DPLL that are not chosen as the reference synchronization clock source to achieve the objective of saving the power consumption.

To achieve the above object, the present invention provides an ISDN PBX capable of automatically choosing the synchronization clock source. The ISDN PBX comprises a plurality of LT-T chips, a plurality of LT-S chips, and a plurality of priority selection circuits. Wherein, the LT-T chips first connect to the network terminal via the trunk interface, and subsequently connect to the central office via the network terminal to receive the frame synchronization clock output signal and the data clock output signal. The subscribe chips connect to the terminal equipment via the subscribe interface to receive the frame synchronization clock output signal and the data clock output signal. The priority selection circuits connect to the LT-T chips, and connected to each other in a manner of daisy chain circuit to send out the frame synchronization clock output signal and the data clock output signal.

Each priority selection circuit of an embodiment according to the present invention comprises a DPLL that is collocated on the chip of the ISDN PBX that is capable of automatically choosing the synchronization clock source. DPLL locks the third clock signal that is synchronous to the central office with the first clock signal to generate the fourth clock signal for using as the clock of the data clock output (abbreviated to DCLO) of the local ISDN PBX. The fourth clock signal generates the fifth clock signal via the second frequency divider of the priority selection circuit for using as the clock of the frame synchronization clock output (abbreviated to FSCO) of the local ISDN PBX.

The present invention further provides a method for automatically choosing the synchronization clock source. The method is suitable for the ISDN PBX having a plurality of LT-T chips and a plurality of LT-S chips. In this method, first a plurality of priority selection circuits is provided. Then, when an external line is called, these priority selection circuits choose a priority selection circuit and the LT-T chip having the highest priority automatically activate the first layer of the LT-T chip to provide the synchronization clock source that is synchronous to the central office.

In an embodiment according to the present invention, the synchronization clock source is generated by the clock recovery circuit. All the other priority selection circuits and the layer 1 of the LT-T chips that are not chosen as the synchronization clock source are all in the disable state. Furthermore, if no external line is called, these priority selection circuits activate the priority selection circuit and the layer 1 of the LT-T chip having the lowest priority to provide the stable free-running clock.

The present invention further provides a control method for the DPLL that is capable of automatically choosing the synchronization clock source. This method is suitable for the ISDN PBX having a plurality of LT-T chips, a plurality of LT-S chips, and a plurality of priority selection circuits. In this method, first a plurality of digital phase-locked loops are provided and collocated in the priority selection circuits. Then, when an external line is called, these priority selection circuits automatically choose a priority selection circuit and the LT-T chip having the highest priority activate the layer 1 of the LT-T chip to provide the synchronization clock signal that is synchronous to the terminal office. Afterwards, the synchronization clock signal is locked by the digital phase-locked loop in the priority selection circuit.

In the other embodiment according to the present invention, only the DPLL that is collocated in the priority selection circuit is activated. All other DPLL that are not chosen as the reference synchronization clock source are all in the disable state. Furthermore, if no external line is called, only the DPLL of the priority selection circuit having the lowest priority is activated and all other DPLL are in the disable state.

As mentioned above, no matter if an external line is called or not, an ISDN PBX capable of automatically choosing a synchronization clock source, together with a method for automatically choosing the synchronization clock source and a control method of the DPLL employing the same according to the present invention, is capable of automatically choosing in real time the synchronization clock source. Thus, the problem of the degradation of system performance resulting from the software continuously polling and matching can be solved. Furthermore, the integration of the DPLL into the chip of ISDN PBX that is capable of automatically choosing synchronization clock source reduces the space that is occupied by the printed circuit board and the number of elements in the printed circuit board. Moreover, because only the power of the DPLL that is chosen as the reference synchronization clock source is turned on, all other power of the DPLL that are not chosen as the reference synchronization clock source are turned off, thus the object of saving power consumption is achieved.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention. In the drawings.

DESCRIPTION OF THE PREFERRED EMBODIMENTS

Figure 1:
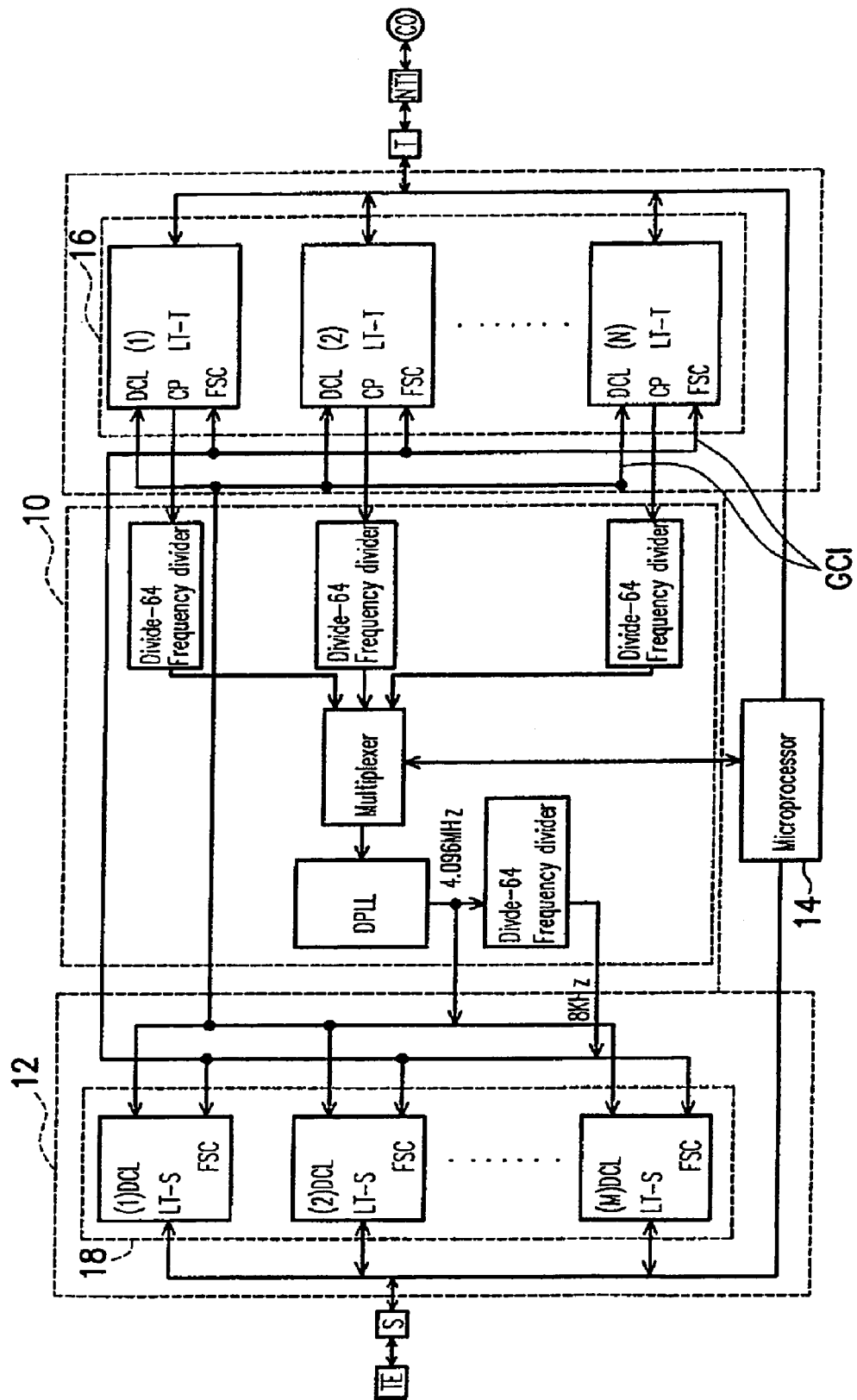
FIG. 1 is a circuit block diagram of the conventional ISDN PBX.
Figure 2:
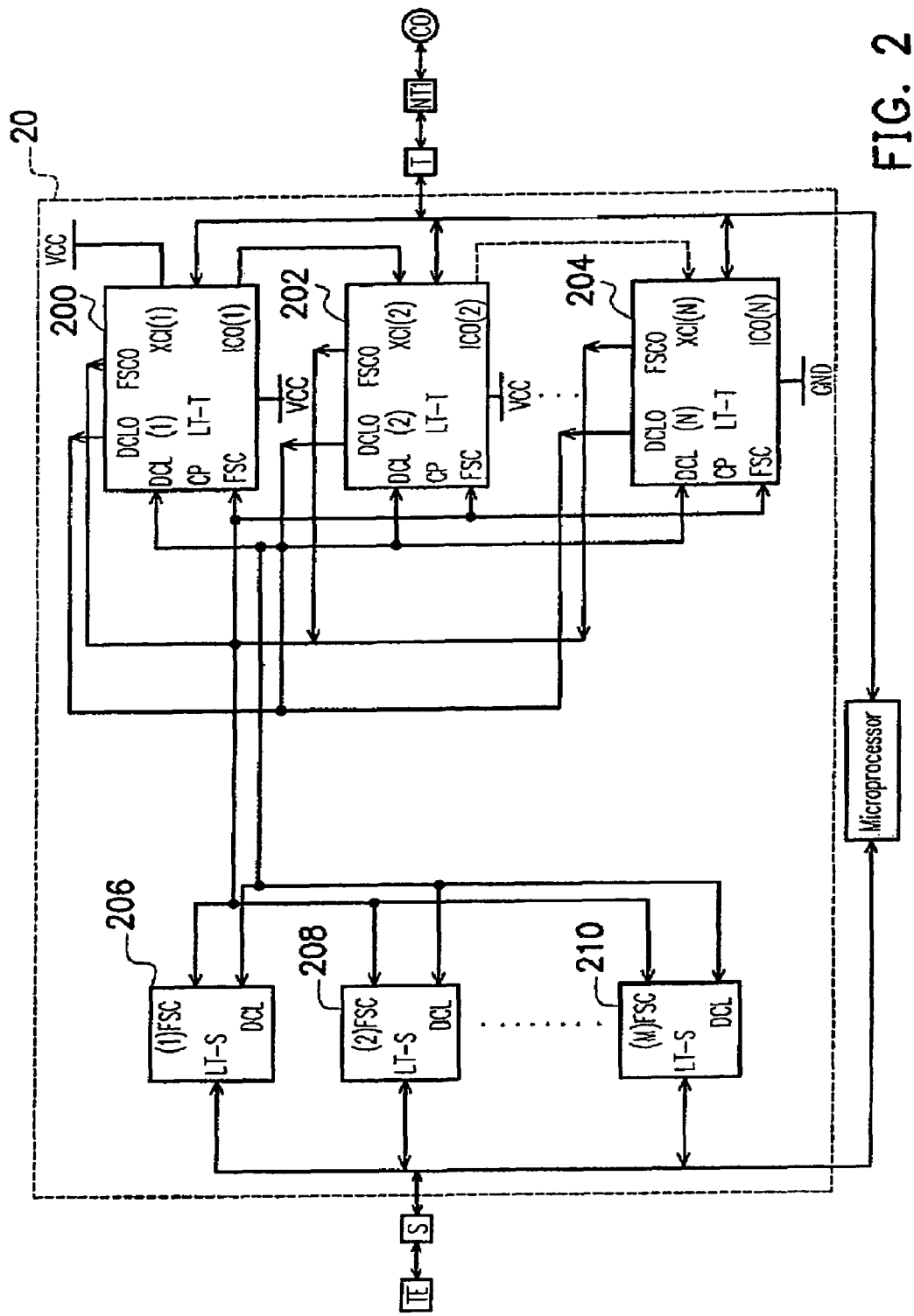
FIG. 2 is a circuit block diagram of an embodiment of the ISDN PBX that is capable of automatically choosing the synchronization clock source according to the present invention.
Figure 3:
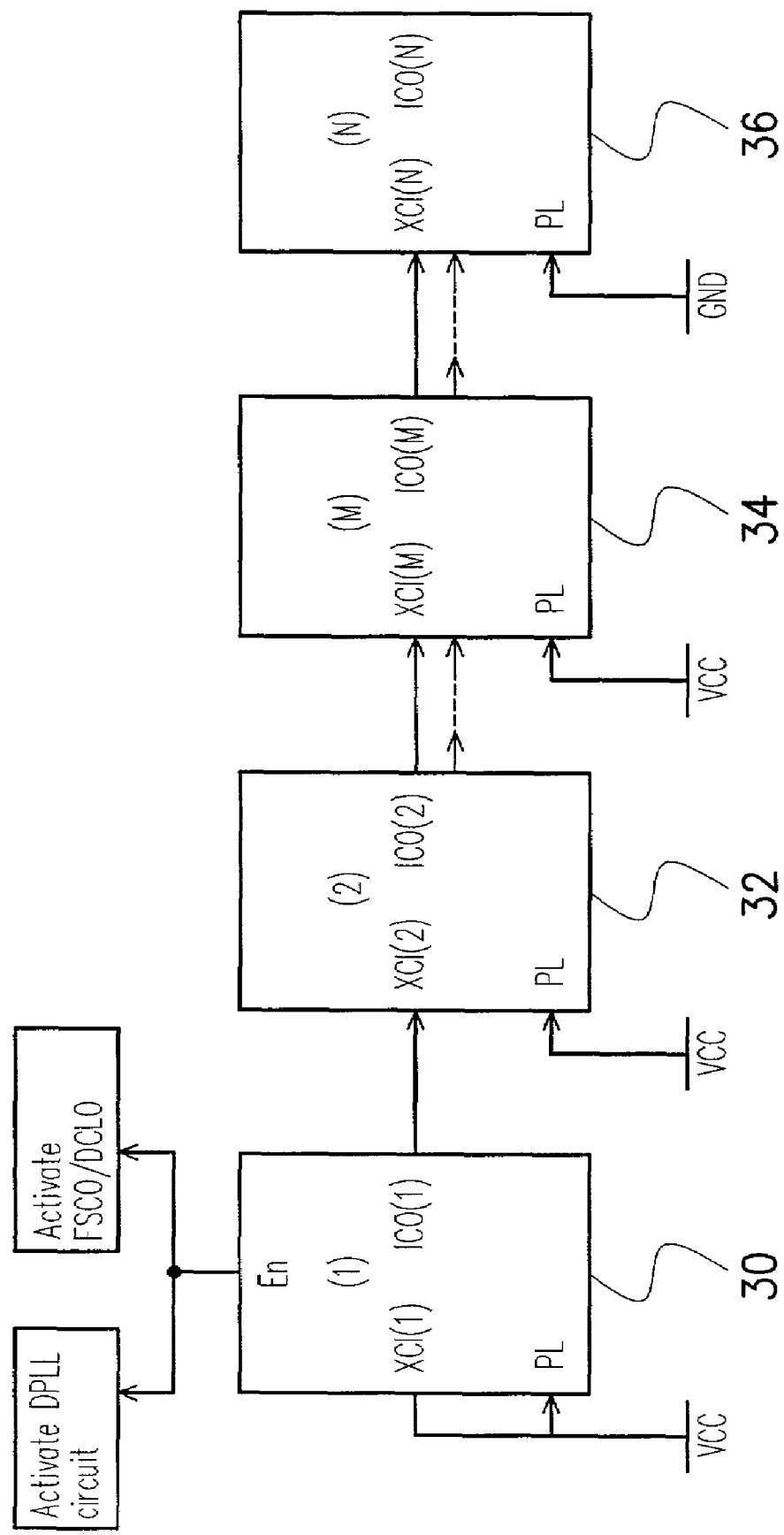
FIG. 3 is a circuit block diagram of the priority selection circuits of an embodiment of the ISDN PBX that is capable of choosing the synchronization clock source automatically according to the present invention.

Referring to FIG. 2, it schematically shows a circuit block diagram of an embodiment of the ISDN PBX, which is capable of automatically choosing the synchronization clock source according to the present invention. The ISDN PBX (20) comprises the first LT-T chip and priority selection circuit 200, the second LT-T chip and priority selection circuit 202 till the Nth (where N is a positive integer) LT-T chip and priority selection circuit 204; and the first LT-S chip 206, the second LT-S chip 208 till the Mth LT-S chip 210. FIG. 3 is a circuit block diagram of the priority selection circuits of an embodiment of the ISDN PBX that is capable of automatically choosing the synchronization clock source according to the present invention. The priority selection circuits comprise the chip 1 (chip (1)) of the first priority selection circuit 30; the chip (2) of the second priority selection circuit 32; till the chip (M) (where M is a positive integer and 1<M<N) of the Mth priority selection circuit 34; and the chip (N) of the Nth priority selection circuit 36.

Figure 4:
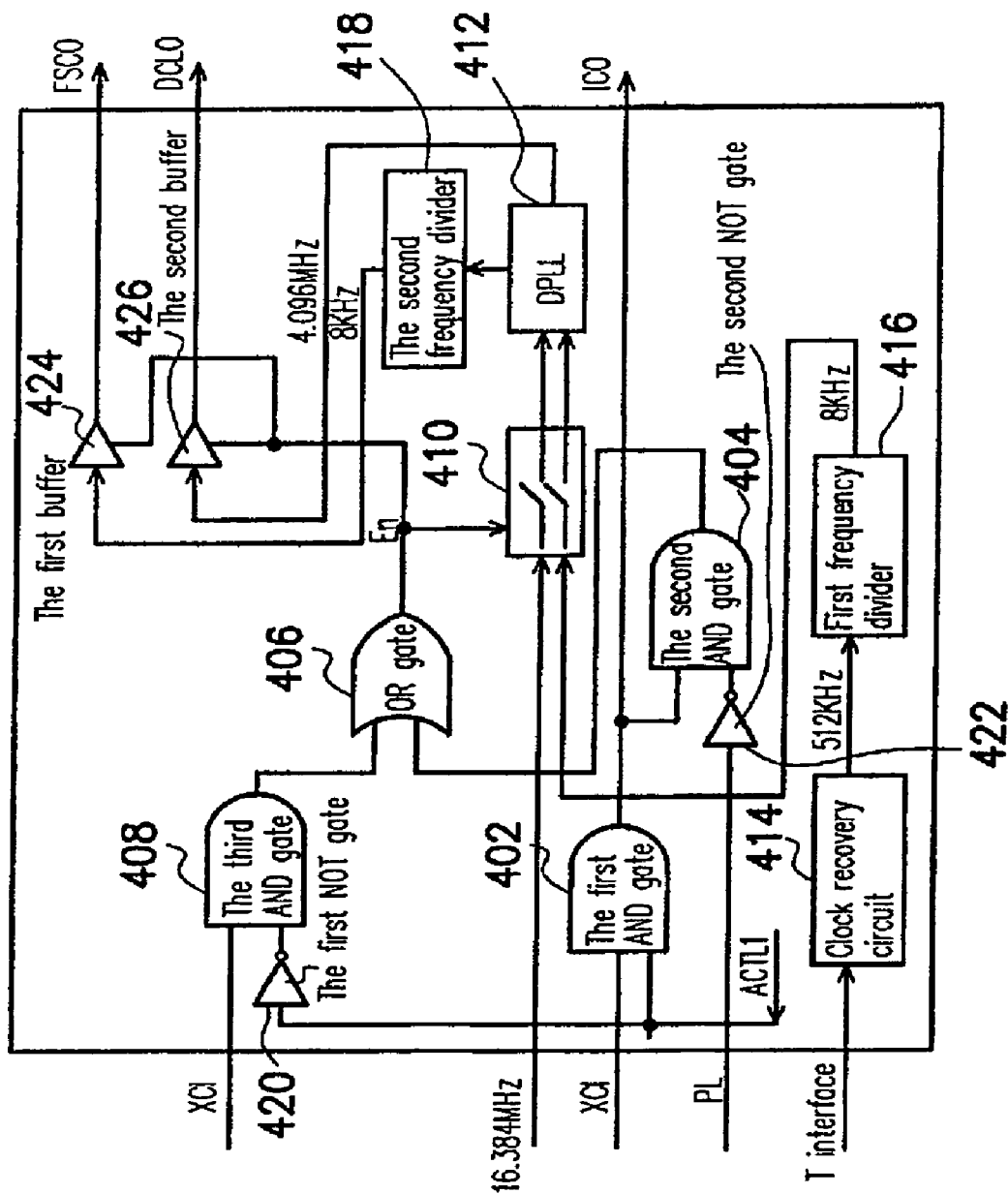
FIG. 4 is a detail circuit block diagram of the priority selection circuit of an embodiment of the ISDN PBX that is capable of choosing the synchronization clock source automatically according to the present invention.

FIG. 4 schematically shows a detail circuit block diagram of the priority selection circuit of an embodiment of the ISDN PBX that is capable of automatically choosing the synchronization clock source according to the present invention. The priority selection circuit comprises: a NOT gate 420, a NOT gate 422, an AND gate 402, an AND gate 404, an AND gate 408, an OR gate 406, a clock recovery circuit 414, a divide-64 frequency divider 416, a switch 410, a DPLL 412, a divide-512 frequency divider 418, a buffer 424, and a buffer 426. Wherein, the NOT gate 420 has an input port that is connected to the active level 1 (abbreviated to ACTL1) signal of the layer 1 of a LT-T chip and an output port that is connected to the input of the AND gate 408. The NOT gate 422 has an input port that is connected to the privilege level (abbreviated to PL) signal and an output port that is connected to the input of the AND gate 404. The AND gate 404 has a first input port that is connected the output port of the AND gate 402, which is also connected to the ICO, the second input port that is connected to the output port of the NOT gate 422. The output port is connected to the input of the OR gate 406. The AND gate 408 has a first input port that is connected to the XCI and a second input port is connected to the output of the NOT gate 420. The output port is connected to the input of the OR gate 406. The OR gate 406 has a first input port that is connected to the output port of the AND gate 408 and the second input port that is connected to the output port of the AND gate 404. The output port is connected to a control port providing signals for buffers 424 and 426 and switch 410. The clock recovery circuit 414 has an input port that is connected to the T interface and an output port that is connected to the divide-64 frequency divider 416. The divide-64 frequency divider 416 has an input port that is connected to the output port of the clock recovery circuit 414 and an output port that is connected to the switch 410. The switch 410 has a first input port that is connected to the 16.318 MHz clock signal, a second input port that is connected to the output port of the divide-64 frequency divider 416, and a control port that is connected to the output of the OR gate 406. The first output port and second output port are connected to the DPLL 412. The DPLL 412 has a first input port that is connected to the first output port of the switch 410 and a second input port that is connected to the second output port of the switch 410. The DPLL 412 has a first output that is connected to the buffer 416 and a second output that is connected the divide-512 frequency divider 418. The divide-512 frequency divider 418 has an input port that is connected to the first output port of the DPLL 412 and an output port that is connected to the input of the buffer 424. The buffer 424 has an input port that is connected to the output port of the divide-512 frequency divider 418 and an output port that is connected to the FSCO, and a control port that is further connected to the output port of the OR gate 406 and the switch 410. The buffer 426 has an input port that is connected to the second output port of the DPLL 412 an output port that is connected to the DCLO, and a a control port that is further connected to the output port of the OR gate 406 and the switch 410.

It is assuming that the priority of the chip (1) is the highest and the priority of the chip (N) is the lowest in the embodiment. The priority selection circuit is detail described accompany with FIG. 4 later.

If the XCI of the chip (M) is 0, i.e. the XCI(M)=0. It means among the chip (M−1), chip (M−2), . . . , chip (1) that has a higher priority than the chip (M), a layer 1 of one of the chips is already in the disable state and it is activated to have the ACTL1 signal of this chip equal to 0. It also means that this chip is chosen to provide the reference synchronization clock source. All other chips that have a lower priority than the chip (M), including the chip (M), chip (M+1), chip (M+2), . . . , chip (N) are not chosen as the synchronization clock source. Therefore, the ACTL1(M) signal of the chip (M) is 1. As shown in FIG. 4, the ICO (M) of the chip (M) is the output of the AND gate 402 having the input of XCI(M) and the ACTL1(M). Since XCI(M)=0, ICO(M)=0. Meanwhile, because of XCI(M+1)=ICO(M)=0, so ICO(M+1)=0. With the same reason, ICO(M+2), ICO(M+3), . . . , and ICO(N) all are 0. Since ICO is one the inputs of the AND gate 404, thus the output of the AND gate 404 is 0. The output of the OR gate 406, En(M), En(M+1), . . . , and En(N) can be abridged as the output of the AND gate 408 having the input of XCI and input of the inverse output signal of the first NOT gate 420 that has ACTL1 input. Because all the XCI of the chip (M), chip (M+1), chip (M+2), . . . , and chip (N) are 0 and ACTL1 is 1, thus the output signal En of the AND gate 408 are all 0. Because all the En of the chip (M), chip (M+1), chip (M+2), . . . , and chip (N) are all 0, the switch 410 is in the open circuit state. Thus, the clock of the DPLL 412 is disabled, and FSCO and DCLO signals are all disabled, so the chip (M), chip (M+1), chip (M+2), . . . , and chip (N) are not chosen as the synchronization clock source. In the meantime, only the DPLL of the chip that is chosen is activated, all the DPLL of other chips are in the disable state. Thus, the objective of the saving power consumption is achieved.

If XCI(M)=1, it means that none of the layer 1 of the chips among the chip (M−1), chip (M−2), . . . , and chip (1) that have higher priority than the chip (M) is activated and they are all in the disable state. Thereby, all the chips that have priority lower than the chip (M), like the chip (M), chip (M+1), chip (M+2), . . . , and chip (N) are possible to be chosen as the synchronization clock source. If any one of the chips among the chip (M), chip (M+1), chip (M+2), . . . , and chip (N) is in active state, the ACTL1 signal of this chip is 0. In this case, the chip (M) is chosen as the synchronization clock source, thus ACTL1(M)=0. Referring to FIG. 4, ICO(M)=0. Accordingly, En(M) can be abridged as the output of the AND gate 408 having the input of XCI and the input of the inverse of the ACT1(M), thus En(M)=1. Meanwhile, because the switch 410 is on, the DPLL 412 starts to activate. The tri-state signal from the T interface generates the 8 KHz clock signal that is synchronous to the central office, via the clock recover circuit 414 and divide-64 frequency divider 416. When the switch 410 is on, the DPLL 412 locks the 8 KHz clock that is synchronous to the central office by using the external clock 16.384 MHz of the chip to generate the 4.096 MHz clock that works as the clock of the DCLO of the local ISDN PBX via the buffer 424. The 4.096 MHz clock generates the 8 KHz clock via the divide-512 frequency divider 418, and works as the clock of the FSCO of the local ISDN PBX via the buffer 424. Since both the DCLO and the FSCO are the signals of the open circuit drain, the DCLO, DCL, FSCO and FSC of the chip (1), chip (2), . . . , and chip (N) are all tightly coupled together, thus the clock of the local ISDN PBX is transmitted to the DCL and FSC of the chip (1), chip (2), . . . , chip (M−1), chip (M+1), chip (M+2), . . . , and chip (N) that are not chosen. As ICO(M)=0 and ICO(M) is serially connected to the XCI(M+1) of the chip (M+1) having the lower priority, so XCI(M+1)=0. Accordingly, the En of the chip (M+1) whose priority is lower than the priority of the chip (M) is 0 and ICO(M+1)=0. With the same reason, the En and the ICO of the chip (M+2), chip (M+3), . . . , and chip (N) are all 0. Even layer 1 of the chip (M+2), chip (M+3), . . . , and chip (N) are in the active state (ACTL1=0), because XCI(M+2), XCI(M+3), . . . , XCI(N) are all 0, thus the En and the ICO of the chip (M+2), chip (M+3), . . . , and chip (N) are all 0. Therefore, if the chip (M) is chosen, the DPLL of the chip (1), chip (2), . . . , chip (M−1), chip (M+1), chip (M+2), . . . , and chip (N) are all in the disable state. That is, only the DPLL of the chip that is chosen is activated, all the DPLL of other chips are in the disable state. Thus, the objective of the saving power consumption is achieved.

If all the chips enter the disable state, that is, ACTL1(1), ACTL1(2), . . . , and ACTL1(N), and XCI(1), XCI(2), . . . , and XCI(N), are all 1, thus ICO(1), ICO(2), . . . , and ICO(N) are all 1. All the PL signals of the chip (1), chip (2), . . . , and chip (N−1) are set to 0 except the PL signal of the chip (N) that has the lowest priority. Since the output of the PL signal of the chip (N), after passing through the NOT gate 422, has a high logic level so the output of the AND gate 404 is high logic level. Accordingly, the output En of the OR gate 406 is 1, thus the switch 410 is on, and provides a free-running clock to DPLL to provide the stable free-running clock to the system when no external line is called. Under such circumstance, only the DPLL of the chip (N) is activated, all other DPLL of the chips are in the disable state. Thus, the objective of saving the power consumption is achieved.

As all mentioned above, the present invention has following advantages:

1. No matter how the external line is operated, the priority selection circuit of the ISDN PBX that is capable of automatically choosing the synchronization clock source can choose the recovery clock that has highest priority, and the layer 1 of the LT-T chip is automatically activated in real time as the synchronization clock source. Therefore, the system performance of the ISDN PBX that is automatically capable of choosing the synchronization clock source is assured. If no external line called, the ISDN PBX that is capable of automatically choosing the synchronization clock source can provide a stable free-running clock to the system.

2. It solves the problem of the software continuously polling and matching to know which line's layer 1 is activated to determine and choose the methods of the synchronization clock source based on the.

3. The software does not have to waste resources to determine the synchronization clock source problem.

4. Since the ISDN PBX includes the DPLL circuits, the space occupied by the printed circuit board and the number of elements in the printed circuit board are reduced. Furthermore, the present invention provides the function of the DPLL power off, that is, only the power of the DPLL that is chosen is turned on, all the power of other DPLL that is not chosen is turned off. Thus, the objective of saving the power consumption is achieved.

Although the invention has been described with reference to a particular embodiment thereof, it will be apparent to one of the ordinary skill in the art that modifications to the described embodiment may be made without departing from the spirit of the invention. Accordingly, the scope of the invention will be defined by the attached claims not by the above detailed description.

What is claimed is:

1. An integrated services digital network private branch exchange, which automatically chooses a synchronization clock source, comprises:
   a plurality of priority selection circuits that are connected to each other as a daisy chain circuit for sending out a frame-synchronization clock output signal and a data clock output signal;
   a plurality of trunk chips that are connected to a network terminal via a truck interface, and then connected to a central office via the network terminal for receiving the frame-synchronization clock output signal and the data clock output signal, wherein each trunk chip comprises one of the plurality of priority selection circuits; and
   a plurality of subscribe chips that are connected to a terminal equipment via a subscribe interface for receiving the frame synchronization clock output signal and the data clock output signal.

2. The integrated services digital network private branch exchange of claim 1, wherein each priority selection circuit of the priority selection circuits comprises:
   a first NOT gate, has an input port of the first NOT gate that is connected to an active level of a layer 1 of one of the LT-T chips, and an output port of the first NOT gate;
   a second NOT gate, having an input port of the second NOT gate that is connected to a privilege level signal, and an output port of the second NOT gate;
   a first AND gate, having a first input port of the first AND gate that is connected to an external clock indication signal, a second input port of the first AND gate that is connected to the active level of the layer 1 of the LT-T chip, and an output port of the first AND gate that is connected to an internal clock output signal;
   a second AND gate, having a first input port of the second AND gate that is connected to the output port of the first AND gate, a second input port of the second AND gate that is connected to the output port of the second NOT gate, and an output port of the AND gate;
   a third AND gate, having a first input port of the third AND gate that is connected to the external clock indication signal, a second input port of the third AND gate connected to the output of the first NOT gate, and an output port of the third AND gate;
   an OR gate, having a first input port of the OR gate that is connected to the output port of the third AND gate, a second input port of the OR gate that is connected to the output port of the second AND gate, and an output port of the OR gate;
   a clock recovery circuit, having an input port of the clock recovery circuit that is connected to a T interface, and an output port of the clock recovery circuit;
   a first frequency divider, having an input port of the first frequency divider that is connected to the output port of the clock recovery circuit, and an output port of the first frequency divider;
   a switch, having a first input port of the switch that is connected to a first clock signal, a second input port of the switch that is connected to the output port of the first frequency divider, a control port, a first output port of the switch and a second output port of the switch that are connected to the output port of the OR gate;
   a digital phase locked loop, having a first input port of the digital phase locked loop that is connected to the first output port of the switch, a second input port of the digital phase locked loop that is connected to the second output port of the switch, a first output port of the digital phase locked loop and a second output port of the digital phase locked loop;
   a second frequency divider, having an input port of the second frequency divider that is connected to the first output port of the digital phase locked loop, and an output port of the second frequency divider;
   a first buffer, having an input port of the first buffer that is connected to the output port of the second frequency divider, an output port of the first buffer that is connected to a frame synchronization clock output signal, and a control port of the first buffer that is connected to the output port of the OR gate, which also connects to the control port of the switch; and
   a second buffer, having an input port of the second buffer that is connected to the second output port of the digital phase locked loop, an output port of the second buffer that is connected to a data clock output signal, and a control port of the second buffer that is connected to the output port of the OR gate, which is also connected to the switch.

3. The integrated services digital network private branch exchange of claim 2, wherein the digital phase locked loop is collocated on the chip of the integrated services digital network private branch exchange that automatically chooses a synchronization clock source.

4. The integrated services digital network private branch exchange of claim 1, wherein each priority selection circuit of the priority selection circuits, comprises:
   a first NOT gate, logically inverts an active level of the layer 1 of one of the trunk chips to generate an output signal of the first NOT gate;

a second NOT gate, logically inverts a privilege level signal to generate an output signal of the second NOT gate;

a first AND gate, proceeds an "AND" logical operation on an external clock indication signal and the active level of the layer 1 of the trunk chip to generate an internal clock output signal;

a second AND gate, proceeds an "AND" logical operation on the internal clock output signal and the output signal from the second NOT gate to generate an output signal of the second AND gate;

a third AND gate, proceeds an "AND" logical operation on the external clock indication signal and the output signal from the first NOT gate to generate an output signal of the third AND gate;

an OR gate, proceeds an "OR" logical operation on the output signal from the third AND gate and the output signal from the AND gate to generate an active level;

a clock recovery circuit, transforms a pseudo-ternary signal from a trunk interface into a second clock signal;

a first frequency divider, divides the frequency of the second clock signal to generate a third clock signal;

a switch, which is in the short circuit state when the active level is high logic level, and in the open circuit state when the active level is low logic level;

a digital phase locked loop, receives the first clock signal and the third clock signal when the switch is in the short circuit state, to generate a fourth clock signal;

a second frequency divider, divides the frequency of the fourth clock signal, to generate a fifth clock signal;

a first buffer:
  when the active level is high logic level, the first buffer is activated, and the fifth clock pulse is used as a clock of the frame synchronization clock output signal; and
  when the active level is low logic level, the first buffer is in the disable state; and a second buffer:
  when the active level is high logic level, the second buffer is activated, and the fourth clock signal is used as a clock of the data clock output signal; and
  when the active level is low logic level, the second buffer is in the disable state.

5. The integrated services digital network private branch exchange of claim 4, wherein the digital phase locked loop locks the third clock signal that is synchronous to the central office with the first clock signal to generate the fourth clock signal that is used as the clock of the data clock output signal of the local integrated services digital network private branch exchange, whereas the fourth clock signal, via the second frequency divider, generates the fifth clock signal that is used as the clock of the frame synchronization clock output signal of the local integrated services digital network private branch exchange.

6. A method, for automatically choosing a synchronization clock source, is suitable for an integrated services digital network private branch exchange having a plurality of trunk chips and a plurality of subscribe chips, comprises the steps of:
  providing a plurality of priority selection circuits that are connected to each other as a daisy chain circuit; and
  when one external line is called, the priority selection circuits choose a priority selection circuit and a trunk chip having the highest priority, from the priority selection circuits and the trunk chips, and activate a layer 1 of the trunk chip to provide a synchronization clock source that is synchronous to a central office.

7. The method of claim 6, wherein the synchronization clock source is generated by a clock recovery circuit of the priority selection circuit.

8. The method of claim 6, wherein each of the trunk chips comprises a DPLL circuit, and the DPLL circuits of the trunk chips that are not chosen as the synchronization clock source, are all in the disable state.

9. The method of claim 6, wherein if no external line called, the priority selection circuits activate a priority selection circuit and a layer 1 of the chip having the lowest priority from the priority selection circuits and the chips to provide a stable free running clock.

10. A control method of a digital phase locked loop that automatically chooses the synchronization clock source, the method is suitable for an integrated services digital network private branch exchange having a plurality of trunk chips and a plurality of subscribe chips, comprises the steps of:
  providing a plurality of digital phase locked loops that are collocated on the priority selection circuits connected to each other as a daisy chain circuit;
  when one external line is called, the priority selection circuits choose a priority selection circuit and a trunk chip having the highest priority from the priority selection circuits and the trunk chips, and activate the layer 1 of the trunk chip to provide a synchronization clock source that is synchronous to a central office; and
  locking the synchronization clock signal that is synchronous to the central office with one of the digital phase locked loops of the priority selection circuits.

11. The control method of claim 10, wherein the digital phase locked loop is in an active state.

12. The control method of claim 10, wherein the digital phase locked loops that are not chosen as the synchronization clock source are all in a disable state.

13. The control method of claim 10, wherein when no external line called, only a priority selection circuit having the lowest priority among the priority selection circuits is activated, all other digital phase locked loops are in the disable state.

* * * * *